United States Patent [19]

Peters

[11] 4,346,929
[45] Aug. 31, 1982

[54] TRUCK WITH LOADING PLATFORM AND BODY

[76] Inventor: Günter Peters, Staumühle 228, 4791 Hövelhof, Fed. Rep. of Germany

[21] Appl. No.: 148,946

[22] Filed: May 12, 1980

[30] Foreign Application Priority Data

May 16, 1979 [DE] Fed. Rep. of Germany ....... 2919608

[51] Int. Cl.³ .............................................. B62D 27/00
[52] U.S. Cl. ..................................... 296/36; 296/181; 105/378
[58] Field of Search ................... 296/36, 32, 181, 183, 296/216; 105/378, 377; 180/188, 189, 193, 199, 206

[56] References Cited

U.S. PATENT DOCUMENTS

| | | | |
|---|---|---|---|
| 1,396,420 | 11/1921 | Glinchikoff | 105/378 |
| 3,687,186 | 8/1972 | Paton | 105/378 |
| 3,724,394 | 4/1973 | Pringle | 105/378 |

*Primary Examiner*—Robert R. Song
*Attorney, Agent, or Firm*—Charles E. Baxley

[57] ABSTRACT

A flat roof truck is shown in which the side-wall of the truck is divided into at least two lengthwise elements that are hinged together. One of the elements also is hinged to the edge of a moveable roof element. Appropriate ropes and pulleys also are provided to draw the elements and the moveable roof element onto a flat, central and stationary element to enable the moveable elements to be folded onto each other above the plane of the flat roof.

9 Claims, 11 Drawing Figures

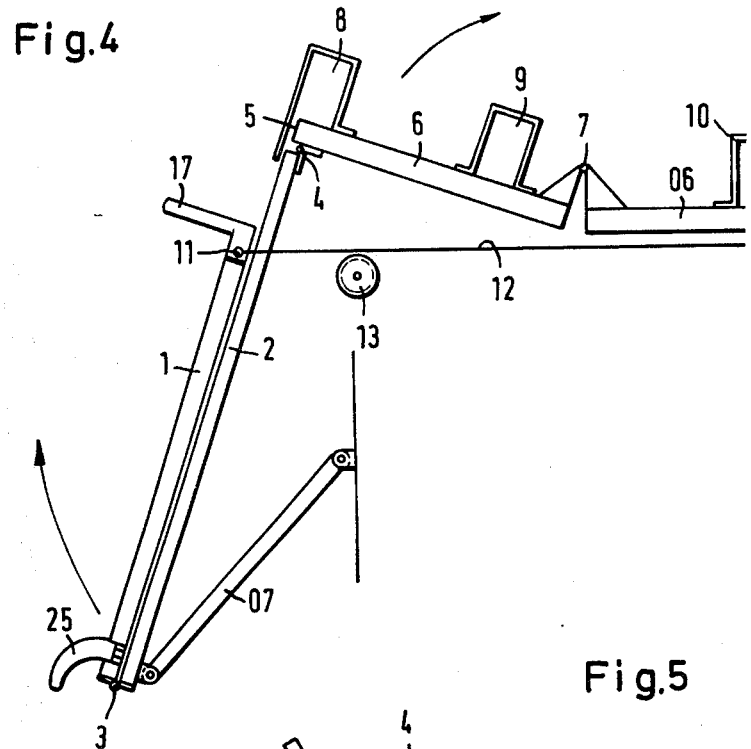
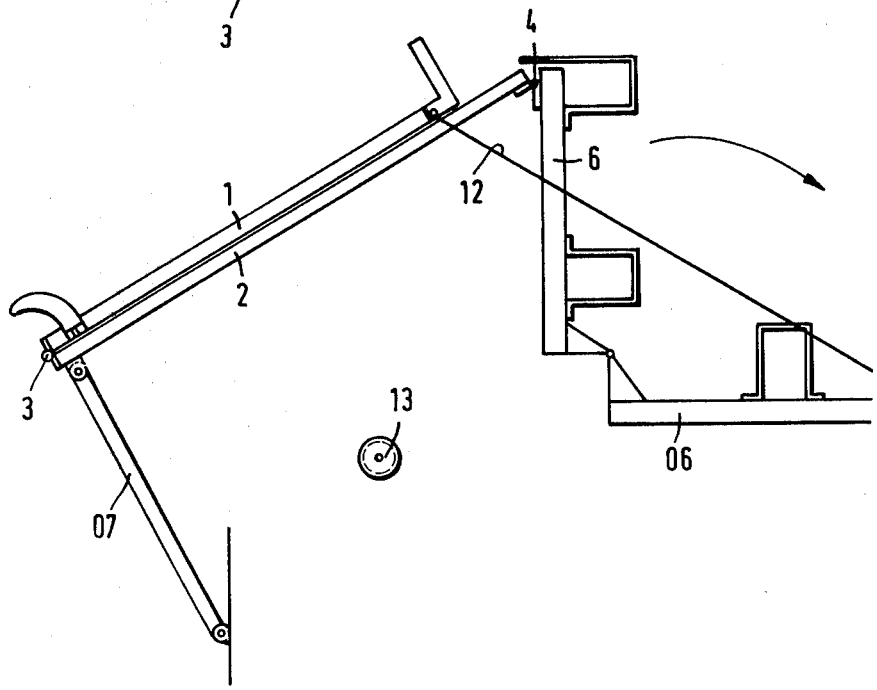

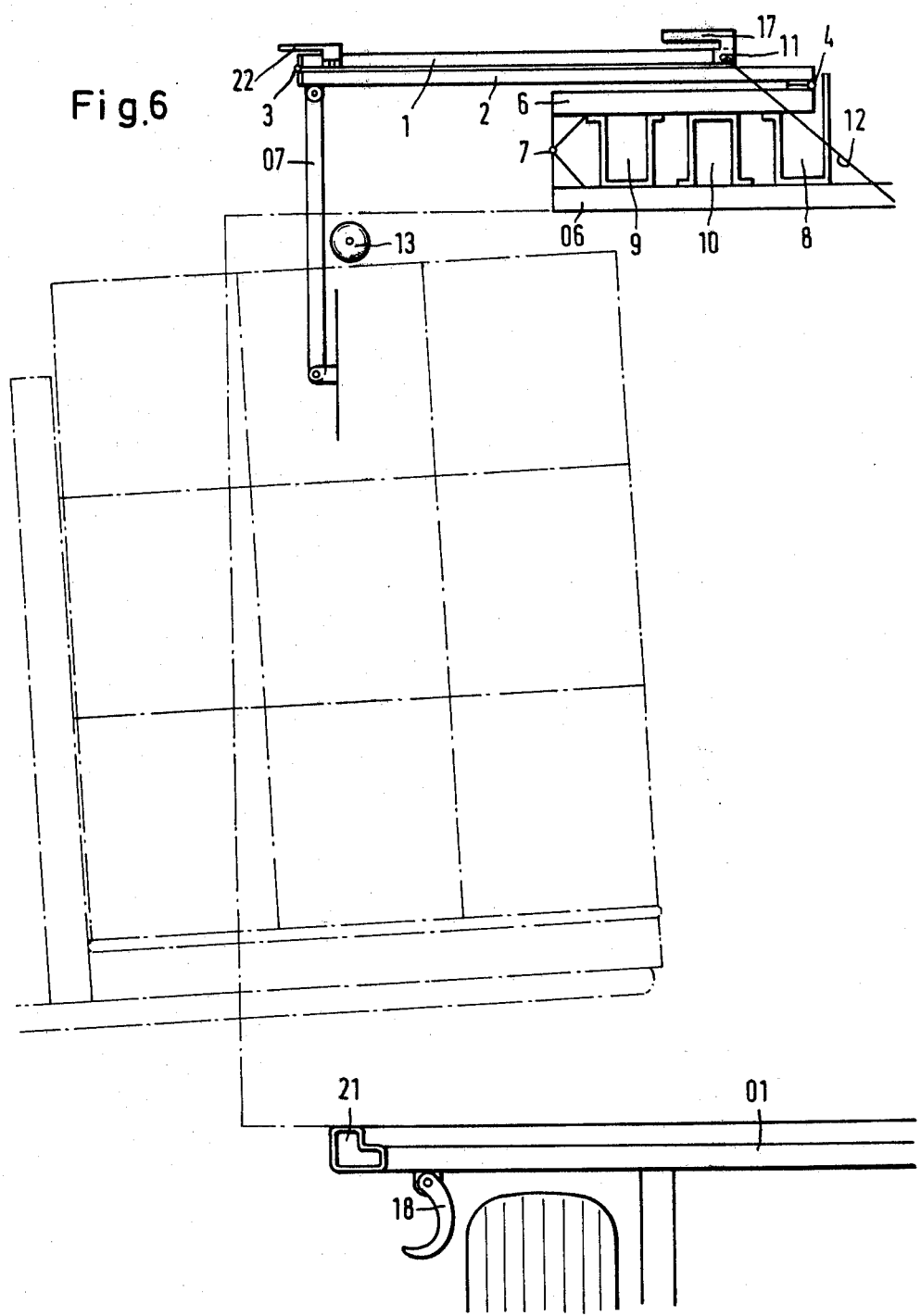

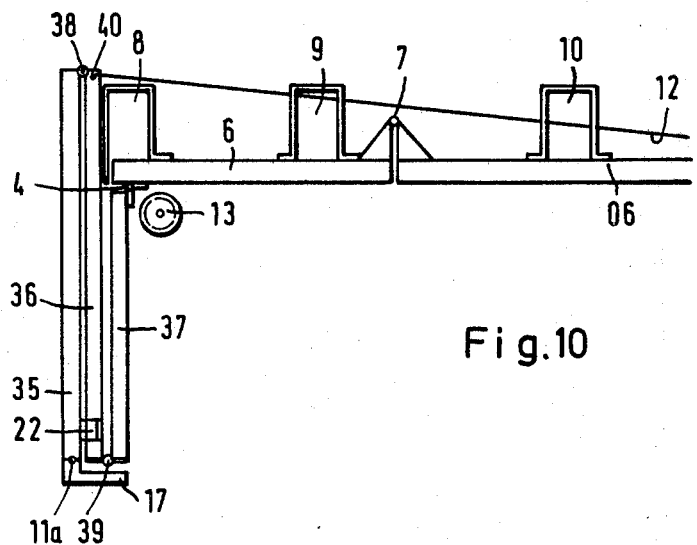
Fig.10
Fig.11
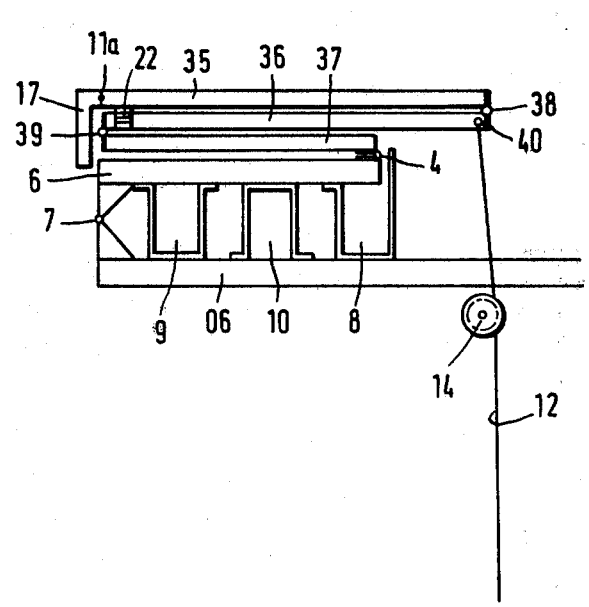

TRUCK WITH LOADING PLATFORM AND BODY

The present invention relates to a truck with a loading platform and body, consisting of high front and rear walls, swingable low side wall elements and upper side wall elements which can be swung upwards together with a roof element adjoining the upper side wall elements around an axis of rotation which is parallel to the longitudinal axis of the vehicle. A lever and rope connection is provided between the roof elements, the upper side-wall elements and the lower side wall elements. The movable roof element and the upper side-wall element are pivotally connected to each other. A rope sheave is eccentrically mounted on the pivot shaft for the roof element. A pulling rope is guided by the sheave to the lower side-wall element, the upper side-wall element being supported by pivotally mounted braces on the front and rear walls.

Trucks of this character are improved, in accordance with the invention, in a manner that enables them to be used as bodies of semi-trailers which have a length of up to 12 meters and more. Handling is further improved without losing previous advantages. Thus, it is possible to provide these vehicles with a light-weight covering, e.g. a tarpaulin, in which the tarpaulin is stretched tight as a covering without additional special means and in particular, without forming folds even under the influence of the wind when driving.

In accordance with the invention, a truck with a loading platform and body of the above-indicated type is characterized by the fact that the lower side-wall element is connected with the upper side-wall element by means of a pivot or hinge. A rope is attached to the lower edge of the lower side-wall element at both side ends of the wall. The rope extends from near the upper edge of the side wall, or outer edge of the roof, over an open guide pulley and horizontally to a guide pulley that lies below the roof behind the end position of the upwardly and backwardly swung side-wall to guide the rope to a winch. In this connection it is preferable for the rope to be guided from a rope sheave directly in front of the point of articulation of the swingable roof element, over a guide roller to a tension spring which is secured to the vehicle. This sheave can be displaced eccentrically on the movable roof element by means of a slot guide and fastening screws.

The side wall also may be divided into three parts of about equal height which are connected to each other by hinges. A rope is attached to the lower edge of the middle side-wall element and guided by way of an open guide pulley that is somewhat below the outer edge of the roof, horizontally to a guide roller which lies below the roof, behind the end position of the upwardly and backwardly swung side-wall, to guide the rope to a winch. In accordance with one suitable embodiment, a wide cleat mounted below the bottom of the vehicle is pivoted to the lower edge of the lower side-wall element. In this case catch hooks are pivoted below the bottom of the vehicle in order to hold the cleat in closed position.

In accordance with another embodiment, inwardly extending catch hooks are provided, preferably, at the upper edge of the lower side-wall element or on the middle side-wall element. These hooks are engaged behind a bolt which is fastened to the frame when the side-wall element is swung. The angular position of the wide cleat which is pivoted to the lower edge of the lower side-wall element is determined when opening the sides by a rope that is fastened directly to the cleat.

In accordance with one preferred embodiment, high lengthwise bars, preferably having the shape of inverted channels, are arranged on the swingable roof element and on the adjoining fixed roof element, the bars lying alongside each other when the roof elements are folded onto each other with the point of articulation between the movable roof element and the fixed roof element lying at least at the mid-height of the lengthwise bars.

The invention is particularly valuable in that it is especially suitable for truck bodies or semi-trailers which are very long, i.e. up to 12 meters and more. It must be borne in mind that the fulcrum or pivotal points for opening and closing the side walls lie at the ends of these walls. In this way the entire length of the body is free of obstacles such as stanchions, or the like, which obstruct loading and unloading.

During opening and closing between the pivotal points at the ends, the long wall elements may experience a very substantial sag. This sag must be kept within the necessary limits through structural measures. In accordance with the invention, moreover, individual elements always hang down vertically or are at an angle to the adjacent elements to which they are pivoted. Consequently, sagging or bending is avoided (or at least considerably reduced) in opening and closing the sides.

Therefore, the advantage is obtained that the body of the vehicle is accessible without interference not only over its entire height but also over its entire length, particularly in the case of very long bodies. In addition to this, it is important for loading and unloading that the body or platform be free, at least to a certain extent, under its longitudinal side edge, and can possibly even be moved under somewhat. This result is promoted, in accordance with the invention, by the fact that no longer (as in the case of other embodiments) does a part of the side wall, when swung into its open condition, hang downward below the platform floor and thus limit the body below the longitudinal side edge of the platform.

The invention will be explained in further detail below with reference to various illustrative embodiments shown in the drawings in which:

FIG. 4 shows the truck of FIG. 1 during the third phase of opening;

FIG. 5 shows the truck body of FIG. 1 during the fourth phase of opening;

FIG. 6 shows the truck body of FIG. 1 completely opened;

FIG. 10 shows the second phase of opening in accordance with FIG. 9; and

FIG. 11 is an embodiment in accordance with FIG. 9, completely open.

Figure 1:
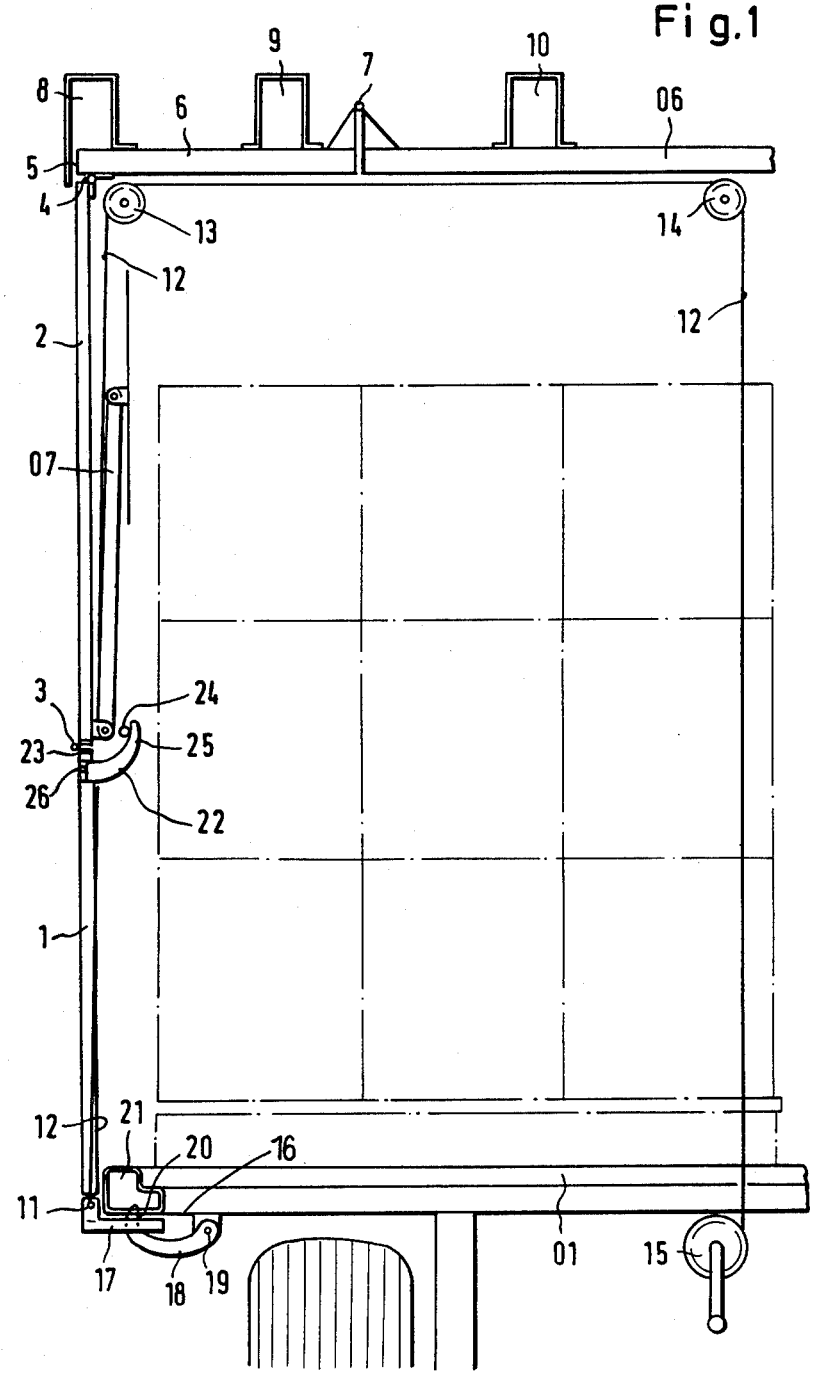
FIG. 1 is a cross section through the truck body in closed condition.
Figure 2:
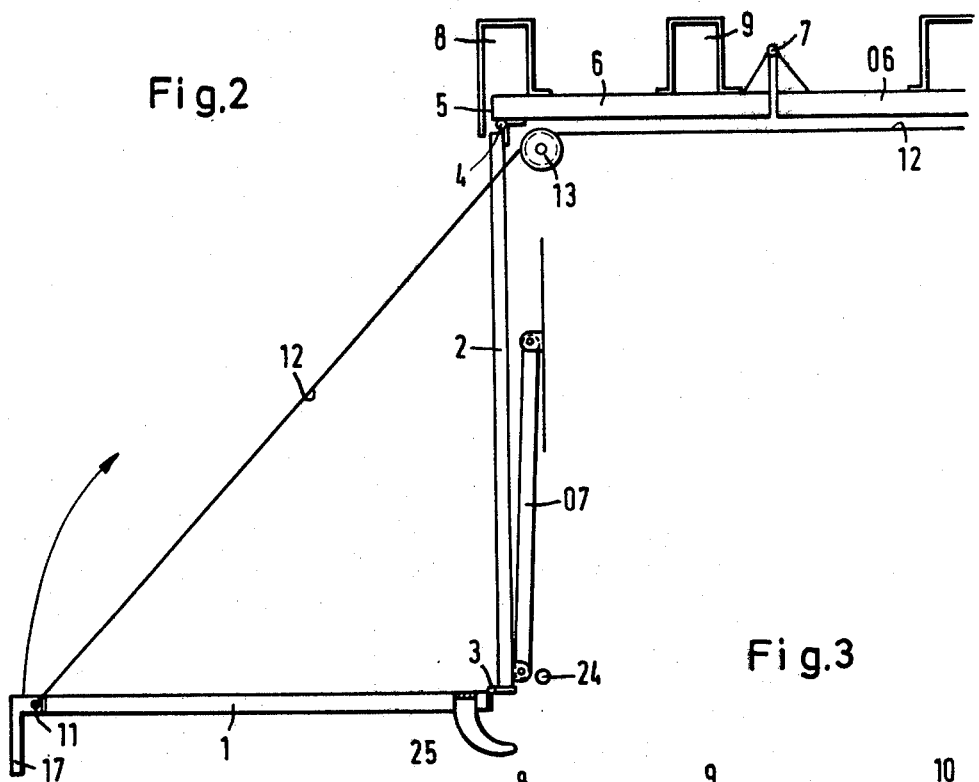
FIG. 2 shows a truck body in accordance with FIG. 1 during the first phase of opening.
Figure 3:
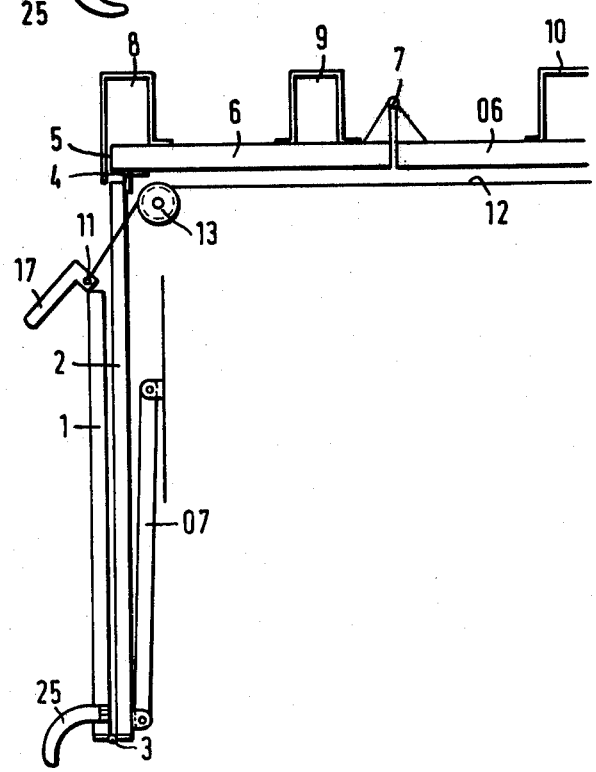
FIG. 3 shows a truck body according to FIG. 1 during the second phase of opening.

In the embodiments shown by way of example, the same reference numbers are used for the same parts. The embodiment in accordance with FIGS. 1 to 8 shows a truck with loading platform 01 and body in which all elements of the side wall and a part of the roof can be swung away in upward direction. The construction in accordance with this embodiment is preferably employed for semi-trailers of greater length, i.e. a length of up to 12 meters.

The side wall consists of a bottom side-wall element 1 and a top side-wall element 2, the two being connected with each other by an articulation or hinge 3 over their entire length. The top side-wall element 2 is also articulated by a pivot or hinge 4 that is secured to the bottom edge 5 of the roof element 6 which can be swung upward. The swingable roof element 6 is connected by a pivot or hinge 7 to the stationary roof element 06. This pivot or hinge 7 is mounted higher than the plane of the roof elements 6 and 06 because high lengthwise bars 8, 9, 10 are arranged on the swingable roof element 6 and the stationary roof element 06, which bars are preferably developed in the form of inverted channel sections that are formed from steel plate. These longitudinal bars serve, essentially, to avoid sagging or bending of the individual roof elements over the length of 12 meters.

The longitudinal bars 8 and 9 which are fastened to the swingable roof element 6 are at such a distance from each other and so positioned, that they come to lie on opposite sides of the longitudinal bar 10 when the roof element 6 is swung over, as shown in FIGS. 5 and 6. The longitudinal bar 10 is fastened to the stationary roof element 06, as noted particularly in FIG. 6. Another advantage of these high longitudinal bars 8, 9 and 10 is that a cover of snow on the roof does not interfere with the swinging up of the roof and the side walls.

In order to satisfy the kinematic conditions which exist with respect to the application of the longitudinal bars, the pivot point 7 for the swingable roof element 6 is sufficiently high to lie somewhat above the midheight of the longitudinal bars 8, 9, 10.

The bottom side-wall element in the embodiment shown in FIGS. 1 to 8 is on both ends of its bottom edge provided an attachment 11 for a pull rope 12. In closed condition the rope 12 extends approximately parallel to the two side-wall elements 1 and 2, which lie one above the other, up to an open guide pulley 13. As shown, the pulley 13 is supported close to the top edge of the side-wall element 2 and the outer edge 5 of the swingable roof element 6 in the region of the front and rear closure walls of the vehicle. The rope 12 is routed through this open guide pulley 13 in a horizontal direction to another guide pulley 14 which also is mounted in the region of the front and rear closure walls of the vehicle body. This rear guide pulley 14 is disposed so far towards the longitudinal center line of the vehicle that, with the side wall and the roof completely swung up (FIGS. 6 and 8) the pulley 14 is sufficiently spaced from the bottom edge of the upward swung bottom wall element 1 for the rope 12 to continue to act obliquely on the bottom edge of the bottom wall element.

The rope 12 is routed downward by the guide pulley 14. This routing is illustrated in a simplified manner to indicate that the rope 12 extends to a manual or power operated actuating winch 15 below the floor of the vehicle or the loading platform 01. In the embodiment shown here, this winch 15 lies below the vehicle approximately in a vertical plane through the central longitudinal axis of the vehicle. Of course, it can also be arranged in such a manner, possibly with additional guide pulleys for the rope 12 that the wench can be mounted below a side edge of the loading platform 01.

A wide cleat 17 is advantageously pivoted to the lower edge 16 of the bottom side-wall element 1 by means of a hinge which is mounted in the same place as the point of attachment 11 for the rope 12. In other words, the wide cleat 17 is firmly connected to the lower edge of the side-wall element 1 and can be swung away together with it. The wide cleat 17 serves to stiffen the side-wall element 1 so that the latter will not sag too much throughout its great length when it is swung up. The cleat also fastens and locks the side-wall element 1 in closed condition. For this purpose a catch hook 18 is pivoted to a hinge pin 19 that is disposed below the loading platform 01. The inwardly bent outer part 20 of the catch hook 18 engages into a corresponding slot in the wide cleat 17. Upon the upward swinging of the hook 18 the inwardly bent outer part 20 of the hook within the slot in the wide cleat 17 pulls the latter, and thus the lower edge of the side-wall element 1, against the associated outer edge 21 of the platform 01 and thus effects a firm closure. A large number of catch hooks 18 can be distributed over the entire length of the platform 01. Upon the swinging down of the catch hook 18 the wide cleat 17, and thus the side wall, are released as soon as the bent part 20 of the hook swings downward from the slot in the wide cleat 17.

Another catch hook 22 is arranged on the upper edge 23 of the bottom wall element 1. This catch hook 23 cooperates with a bolt 24 that is mounted on the front wall and on the rear wall respectively of the truck body. It should be noted that the bend 25 of this hook 22 engages behind the bolt 24 when the side wall element 1 is swung around the pivot point 3 and upon the further swinging of the side-wall element 1 pulls the upper edge 23 of the lower wall element 1, and thus also the lower edge of the top wall element 3, firmly against the front and rear walls of the vehicle body, fastening them by pressing them against the bolts 24.

The hook 22 is so fastened to the bottom wall element 1 that it can be swung laterally, i.e. it is swingable about a hinge 26 so that it can be swung approximately into the plane of the side-wall element 1. This inward swinging takes place automatically upon the upward swinging of the side elements so that the hook, in the upward swung position that is shown in FIG. 6, rests on the original inner side of the side-wall element 1 and thus does not represent a danger. As the side-wall elements are swung down, the hook 22 falls by the action of gravity back into the position shown in FIG. 2 so that upon the final inward swinging and closing of the side elements the hook 22 extends behind the bolts 24.

The top side-wall element 2 is supported in the vicinity of its lower edge by a pivoted brace 07. This brace 07 is pivotally connected at its lower end, as shown in FIG. 1, with the lower inner end of the top of the side-wall element 2 and is pivotally connected at its upper end with the rear wall and front wall respectively of the vehicle body.

Figure 7:
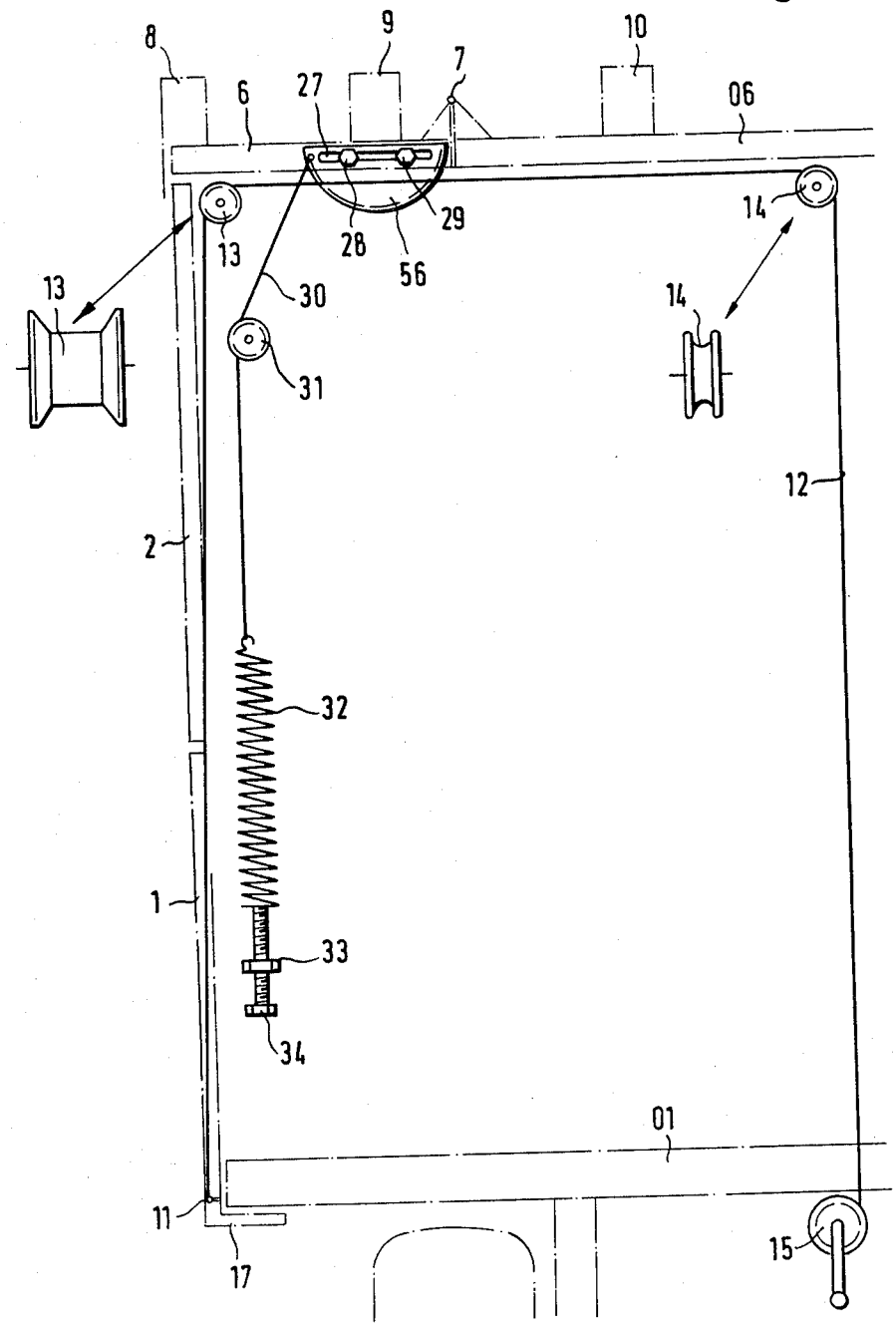
FIG. 7 shows a rope plan with all actuating devices in accordance with the embodiment of FIG. 1, in closed condition.

The open catch-pulley 13 that changes the direction of the rope 12 at the top side edge of the vehicle is shown on a larger scale in front view in FIG. 7. It can be seen that this guide pulley 13 has a wide central groove so that the rope can lift from this pulley and especially to be received on it without missing the groove in the pulley 13 because it is too narrow and dropping alongside of it.

Figure 8:
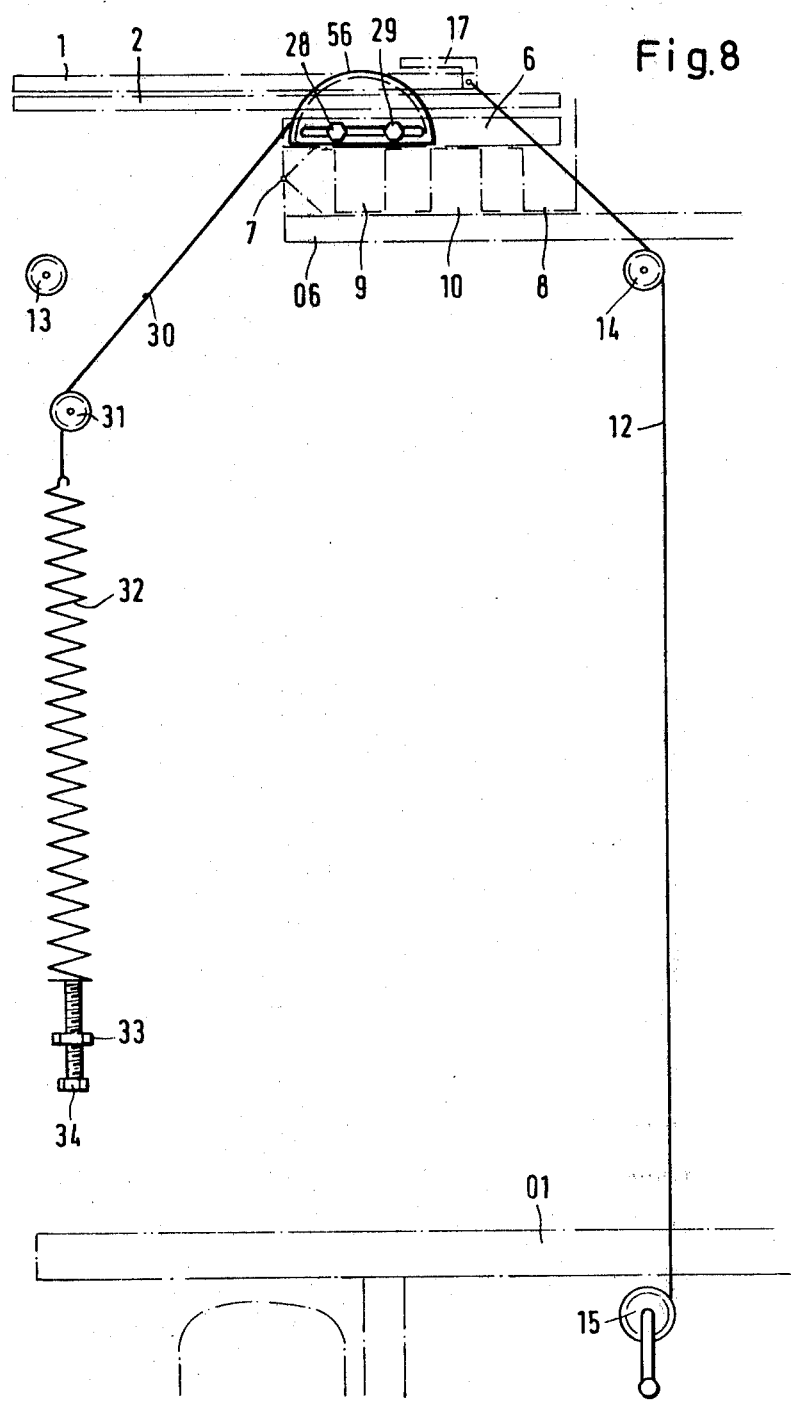
FIG. 8 shows a rope plan corresponding to FIG. 7, in open condition.

In FIGS. 7 and 8 further actuating devices for the embodiment described are explained. A rope sheave or a partial rope sheave 56 is attached to the upper swingable roof part 6. In the rope sheave there is provided a long continuous slot 27 which enables two screws 28 and 29 to connect the rope sheave 56 firmly to the front and rear side edges of the swingable roof part 6. By relying on the slot 27 to position the rope sheave 56 it is possible to adjust the location of the rope sheave, as will be explained further below.

To the rope sheave 56 there is connected an additional rope 30 which passes over a guide roller 31 on the front and rear walls, respectively, of the vehicle body, to a tension spring 32 that is mounted below the associated roller 31. These tension springs are firmly attached at their opposite end to the corresponding front and rear walls respectively of the vehicle body and are provided with an adjusting device 34 for setting a desired tension on the spring 32. The rope sheave 56 with the rope 30 and the tension spring 32 have the following function: Upon the swinging up of the swingable roof element 6, the rope 30 bears against the outer periphery of the rope sheave 56. The spring 32 is stressed in tension upon swinging. In this way the upwardly swung roof and side-wall elements are relieved of stress so that in the completely upward swung position, as shown in FIGS. 6 and 8, the tensile force of the tensioned spring 32 is greater than the weight that must be lifted to raise the roof and side wall elements which are folded together on the roof element 06. To swing these elements back the force applied by the winch 15 to the rope 12 first is released and the tension force stored in the spring 32 initiates the motion. Upon swinging the roof and wall elements into the top position on the roof, moreover, also is slower and does not lead to a violent swinging movement with corresponding impact because of the action of the tension spring 32.

The function of the embodiment described above now will be explained. After the lower catch hooks 18 are swung down and the wide cleat 17 is released, the winch 15 is placed in operation. The winch 15 thus draws the rope 12 and the lower edge 11 of the bottom-side-wall element 1 outward and upward. The side-wall element 1 swings around the hinge 3 from the closed position shown in FIG. 1 up to a position that corresponds to FIG. 2. In this connection the hook 22 on the upper edge of the side-wall element 1 is also released from engagement with the bolt 24. Upon further swinging motion into the position shown in FIG. 3, the outer surface of the bottom wall element 1 bears against the outer surface of the top wall element 2. Upon further winching of the rope 12, the top wall element 2 is swung outward and upward, guided by the brace 07, together with the swingable roof element 6 around the hinge 7 on the fixed roof element 06 into a position corresponding to FIG. 4.

In this position, the rope 12 lifts from the open groove in the guide pulley 13 and, upon further movement, moves from the rear guide pulley 14 up into a position corresponding to FIG. 5 in which the side-wall elements 1 and 2 which have been swung together are guided by the lower brace 07 and the outer roof element 6 which also is being swung upwardly.

With further movement, the movable roof element 6 rests itself with its bars 8 and 9 on opposite sides of the fixed lengthwise bar 10 on the fixed roof element 06 with the two side-wall elements 2 and 1 folded above. In this position the hook 22 swings on its hinge 26 to one side under the action of gravity and lays itself flat.

From FIG. 6 it can be noted that in this condition the vehicle body is open to an extent that permits the vehicle to be loaded, for instance, with a fork-lift truck, as indicated in the drawing with broken lines. Thus, as shown no lower or upper protrusions from the longitudinal side wall interfere with loading or unloading. In fact, by folding back the outer upper roof element 6 even some additional vertical space has been obtained. The swinging movements are indicated in the individual opening phases by arrows. From FIGS. 7 and 8 it can be noted that, upon the opening the spring 32 is tensioned as the rope 30 bears against the rope sheave 56 thus assuming a portion of the load imposed by the side-wall and roof elements which are folded together.

The closing process takes place in the reverse direction, first of all by releasing the rope 12. In these circumstances the swingable roof element 6 moves into the position shown in FIG. 5 under the force applied by the tensioned spring 32. Approximately from the position shown in FIG. 5, all of the elements then descend under the action of gravity and guidance of the brace 07 back into the closed position that is shown in FIGS. 1 and 7. In this position the wide cleat 17 is swung firmly in under the lower edge 21 of the platform 01 and the bend of the hook 18 is swung upward and introduced into the slot in the wide cleat to permit the lower edge 16 of the lower side-wall element 1 to be drawn firmly against the outer edge 21 of the platform 01. In this manner, the side wall is securely closed.

Figure 9:
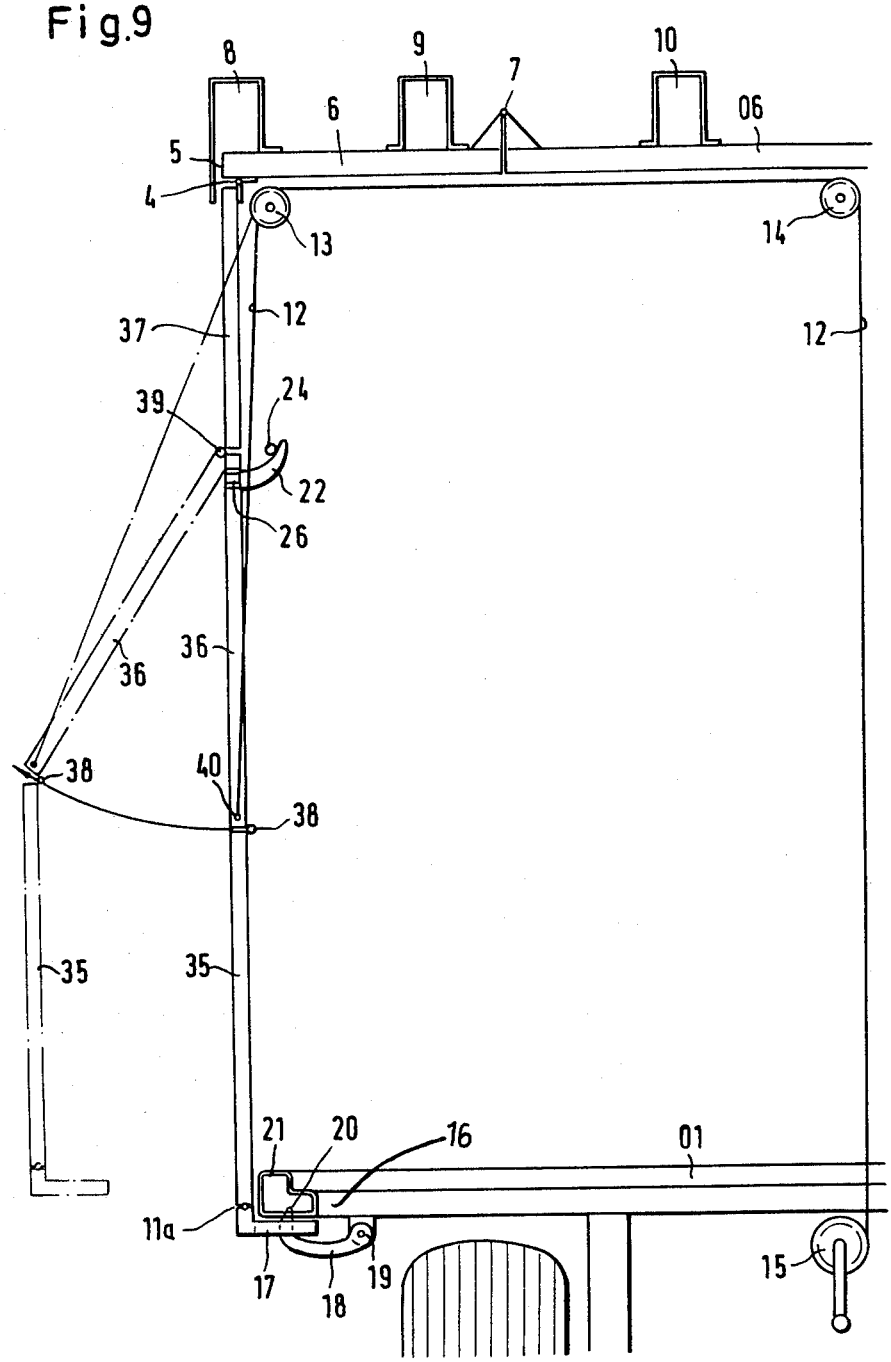
FIG. 9 shows another embodiment in the form of a cross section through a truck body in closed condition and during the first phase of opening.

In another embodiment, shown in FIGS. 9 to 11, the side wall is divided into three elements, namely a bottom side wall element 35, a middle side wall element 36 and a top side-wall element 37. The bottom wall element 35 is connected with the middle wall element 36 by means of a continuous hinge 38 that is located on the inside of the truck body. The middle wall element 36 is connected with the top wall element 37 by means of a hinge 39 located on the outside of the truck body. The rope 12 in this embodiment is attached to the point 40 at the lower edge of the middle wall element 36. All other parts, which agree in their function with the parts of the embodiment described above, are provided in this embodiment with the same reference numbers.

The function of this embodiment, in accordance with FIGS. 9 to 11 can therefore be immediately described. From the closed position, the catch hooks 18 are first of all swung downward about the pivot point 19 so that the bend 20 emerges from the slots in the wide cleat 17 in order to release the lower edge of the side wall. The three pivotally interconnected elements of the side-wall then hang downwardly.

By actuating the winch 15, the rope 12 acts on the lower edge 40 of the middle side-wall element 36, in which circumstance it may be necessary first to lift somewhat the lower end of the side wall from the platform 01. The rope then first draws into the position shown in dot-dash line in FIG. 9, in which position the middle side-wall element 36 extends obliquely from its hinge point 39 while the bottom side-wall element 35 hangs loosely and vertically downward from the hinge point 38.

As the middle wall element 36 is drawn up further its outer side comes against the outer side of the top wall element 37, is shown in FIG. 10. In this case the bottom wall element 35 still hangs downwardly under the influence of gravity. This has the considerable additional advantage that the angular relationship between the bottom downwardly-hanging side-wall element 35 and the middle side-wall element 36 prevents the middle side-wall element 36 from sagging at its outer edge, which is held, after all, merely by the two ropes 12 at the two ends over a length of up to 12 meters.

It can be seen that in the position shown in FIG. 10 in which all three side-wall elements have folded onto each other, the bottom closure is provided by the wide cleat 17. In this position, the rope 12 has also already lifted from the groove in the open guide pulley 13, as has been explained in detail in connection with the preceding embodiment.

Upon drawing the rope 12 further, the upper roof element 6 now is swung upward around its hinge 7, to place the roof elements together by swinging along in the right-angle position that is shown in FIG. 10. In this way the roof element 6 also is prevented from sagging over its long length of 12 meters during these opening and swinging movements. With further swinging movement all of side-wall elements then lay themselves on the backwardly swung roof element 6 which, in its turn, rests upon the lengthwise bars 8 and 9 that are disposed each on one of the sides of the lengthwise bar 10 of the stationary roof element on this roof part 06.

To relieve load on swinging up and starting the turn movement during the closing process there is again provided a rope sheave with rope and tension spring 32 in the same way as that which was explained in detail in connection with the preceding embodiments. The closing movement takes place in the reverse sequence to the opening movement in accordance with FIGS. 11, 10 and 9. It should be noted that in this embodiment also not only is the fully opened side wall of the vehicle body available for loading and unloading, but that also the outer roof element is swung away so that loading and unloading are considerably facilitated, particularly when using mechanical loading means such as fork trucks and the like.

I claim:

1. A truck having a flat-roof with a central stationary element, a loading platform, a pair of spaced end walls at opposite ends of the loading platform and a body comprising a side-wall made of two lengthwise elements that are hinged together, the side-wall element adjacent to the roof of the truck being hinged along the edge that is adjacent to the roof, an element of the roof that is hinged to said side-wall element also being moveable and, hinged to the central stationary roof element by a hinge elevated above the flat roof, a rope attached to said side-wall element that is hinged only to said roof-hinged side-wall element, which rope extends near the hinge between the side-wall element and the moveable roof element, an open guide pulley secured to the stationary end walls and for orienting the rope in a plane parallel with the stationary roof element, a guide pulley within the truck body for leading the rope away from said central stationary roof element, and a winch for selectively drawing and releasing the rope to open and to close the side-wall of the truck.

2. A truck according to claim 1, further comprising an additional rope, a rope sheave secured to the underside of the moveable roof within the truck body, an additional guide pulley for routing the additional rope, a tension spring secured to the truck and to the routed rope.

3. A truck according to claim 2, wherein said rope sheave that is secured to the underside of the moveable roof further comprises a rope sheave that is selectively moveable relative to the truck, said sheave having a slot guide formed therein for the additional rope, and fastening screws in said slot for attaching the sheave to the truck.

4. A truck with loading platform and body according to claim 1, wherein the side-wall further comprises three approximately equally wide elements in which one of the three elements is disposed between the other two of the elements, hinges connecting the side-wall elements together to form the side-wall, the rope drawing the middle side-wall element, said rope extending over the open guide pulley to route the rope parallel with the stationary roof element to the guide pulley which lies behind the end position of the upward and backward swung side-wall elements below the roof, the rope being led to the winch.

5. A truck according to claim 1 or 4, further comprising a wide cleat for engagement to the vehicle, the cleat being pivoted to the edge of the side-wall element that is hinged to only one other side-wall element.

6. A truck according to claim 5 further comprising catch hooks pivoted to the vehicle in order to hold the cleat in closed position.

7. A truck according to claim 1, further comprising a bolt, inwardly protruding catch hooks arranged on the hinged edge of the side-wall element that is hinged only to one other side-wall element, said hooks, when the side-wall is swung down, engaging behind the bolt which is fixed to the truck.

8. A truck according to claim 1 further comprising a hinge for pivoting the wide cleat to the edge of the side-wall element that is hinged only to one other side-wall element.

9. A truck according to claim 1 or 4, further comprising lengthwise bars arranged on the moveable roof element and the adjoining fixed roof part, said bars lying alongside of each other when said roof elements are swung one over the other, and that the point of articulation between the moveable roof element and the fixed roof element lies at least at the mid-height of the longitudinal bars.

* * * * *